(12) United States Patent
Sundkvist et al.

(10) Patent No.: US 7,484,542 B2
(45) Date of Patent: Feb. 3, 2009

(54) TIRE TREAD WITH SIPES HAVING TIE BARS

(75) Inventors: Karl Eric Sundkvist, Akron, OH (US);
Eddy Dong-Rong Pan, Stow, OH (US);
Tooney Raymond Jones, Norton, OH
(US); David Allen Griffin, Akron, OH
(US); John Russell Shaffer, Massillon,
OH (US); Charles Kenneth Schmalix,
Canal Fulton, OH (US); **Keith Eric
Grabo**, Brecksville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 308 days.

(21) Appl. No.: 11/240,904

(22) Filed: Sep. 30, 2005

(65) Prior Publication Data

US 2006/0169376 A1    Aug. 3, 2006

Related U.S. Application Data

(60) Provisional application No. 60/648,350, filed on Jan. 28, 2005.

(51) Int. Cl.
*B60C 11/12* (2006.01)
(52) U.S. Cl. .............................. 152/209.18; 152/209.22; 152/DIG. 3
(58) Field of Classification Search ............ 152/209.18, 152/209.22, DIG. 3, 902
See application file for complete search history.

(56) References Cited

U.S. PATENT DOCUMENTS

| | | | | |
|---|---|---|---|---|
| 2,302,027 A | | 11/1942 | Havens ..................... 152/209 |
| 5,109,904 A | | 5/1992 | Numata et al. ............. 152/209 |
| 5,316,062 A | * | 5/1994 | Lurois ................... 152/209.22 |
| 5,361,816 A | * | 11/1994 | Hitzky ................... 152/209.22 |
| 6,003,575 A | * | 12/1999 | Koyama et al. ......... 152/DIG. 3 |
| 6,050,313 A | * | 4/2000 | Tsuda ................... 152/DIG. 3 |

FOREIGN PATENT DOCUMENTS

| | | |
|---|---|---|
| DE | 40 18 463 | 12/1990 |
| JP | 63-137003 | 6/1988 |
| JP | 03-014704 | * 1/1991 |

OTHER PUBLICATIONS

European Search Report, completed Mar. 30, 2006.
Patent Abstracts of Japan, Publication No. 63137003, Publication Date Jun. 9, 1988.

* cited by examiner

*Primary Examiner*—Steven D Maki
(74) *Attorney, Agent, or Firm*—Robert N. Lipcsik

(57) ABSTRACT

A tire tread has at least three rows of tread elements, each tread element in the at rows has at least one sipe and at least one sipe in each tread element row has a tie bar therein. Each tie bar in the sipes has a volume, and the volume of the sipe tie bar in each tread element in each row is not more than 10% different than the volume of the sipe tie bar in each tread element in any other tread row. Several of the tread rows have transverse grooves having groove tie bars therein.

3 Claims, 2 Drawing Sheets

TIRE TREAD WITH SIPES HAVING TIE BARS

This application claims the benefit of U.S. provisional application No. 60/648,350, filed on Jan. 28, 2005.

FIELD OF THE INVENTION

The present invention is directed to a tire tread. More specifically, the present invention is directed to a tire tread.

BACKGROUND OF THE INVENTION

It is well known when forming tire treads to provide the tread with either continuous ribs of repeating tread elements or circumferentially adjacent individual tread blocks. The ribs or tread blocks dictate, in part, the performance characteristics of the tire. The number and configuration of both grooves and sipes in a tread can affect the traction and wet performance characteristics of the tire.

Just as with other types of manufactured articles, the desired characteristics for a tire changes with time. If a tire generates a lot of noise during vehicle operation, that noise is transmitted into the vehicle interior. As vehicle interiors have become more insulated and quieter, the desire for a quiet tire has increased. Many factors affect the noise level of a tire, from the materials of construction to the tire tread. Modifying one structural element of a tire may negatively affect another element of the tire, or other tire characteristics.

SUMMARY OF THE INVENTION

The present invention is directed towards a tire tread designed for reduced tire noise. Additionally, the traction characteristics of the tire are maintained.

In one of the disclosed inventions, a tire tread has at least three rows of tread elements, each tread element in the at least three rows has at least one sipe therein, wherein the at least one sipe in each tread element row has a tie bar therein. Each tie bar in the sipes has a volume, and the volume of the sipe tie bar in each tread element in each row is not more than 10% different than the volume of the sipe tie bar in each tread element in any other tread row. Preferably, the volume difference between the sipe tie bars in the different rows is not more than 5% and most preferably, the volume of the sipe tie bars is substantially similar or constant across the tread width.

In one aspect of the invention, the tread has a tread row centered on the centerline of the tread. The radial height of the sipe tie bar in the center tread row is greater than the radial height of the sipe tie bars in the remaining rows of tread elements. Additionally, the axial width of the sipe tie bars in the different rows may differ.

Also disclosed is a tire tread comprising at least two tread element rows, each row comprising a plurality of transverse grooves. The grooves in each row have a tie bar therein, the tie bars having a radial height. The radial height of the tie bars in the tread element rows differ.

In one aspect of the invention regarding groove tie bars, one of the tread element rows is a shoulder tread element row and the other row is located axially inward of the shoulder tread element row. The two rows may be directly adjacent to one another or may both be located on the same side of the tread centerline.

In another aspect of the invention, the groove tie bars in one row have a height greater than one-half the transverse groove depth. Additionally, the groove tie bars in the other row have a depth not greater than one-half the transverse groove depth.

In another aspect of the invention, the tread may have both the sipe tie bars and the groove tie bars therein.

DEFINITIONS

The following definitions are controlling for the disclosed invention.

"Axial" and "axially" are used herein to refer to lines or directions that are parallel to the axis of rotation of the tire.

"Groove" means an elongated void area in a tread that may extend circumferentially or laterally about the tread in a straight, curved, or zigzag manner. Circumferentially and laterally extending grooves sometimes have common portions and may be sub classified as "wide", "narrow", or "sipe". A "narrow groove" has a width in the range from about 0.8% to 3% of the compensated tread width and a "wide groove" has a width greater than 3% thereof. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire.

"Sipes" refers to a type of groove molded into a tire tread. Sipes tend to close completely in a tire footprint. In the appended drawings, sipes are illustrated by single lines because they are so narrow. A sipe has a width in the range from about 0.2% to 0.8% of the compensated tread width.

"Tie-Bar" refers to an extra thickness of rubber at the bottom of a groove such that, in the location where the extra rubber is present, the groove depth is less than the groove depth at all other locations.

"Tread" means a molded rubber component which, when bonded to a tire casing, includes that portion of the tire that comes into contact with the road when the tire is normally inflated and under normal load.

BRIEF DESCRIPTION OF THE DRAWINGS

The invention will be described by way of example and with reference to the accompanying drawings in which.

DETAILED DESCRIPTION OF THE INVENTION

Figure 1:
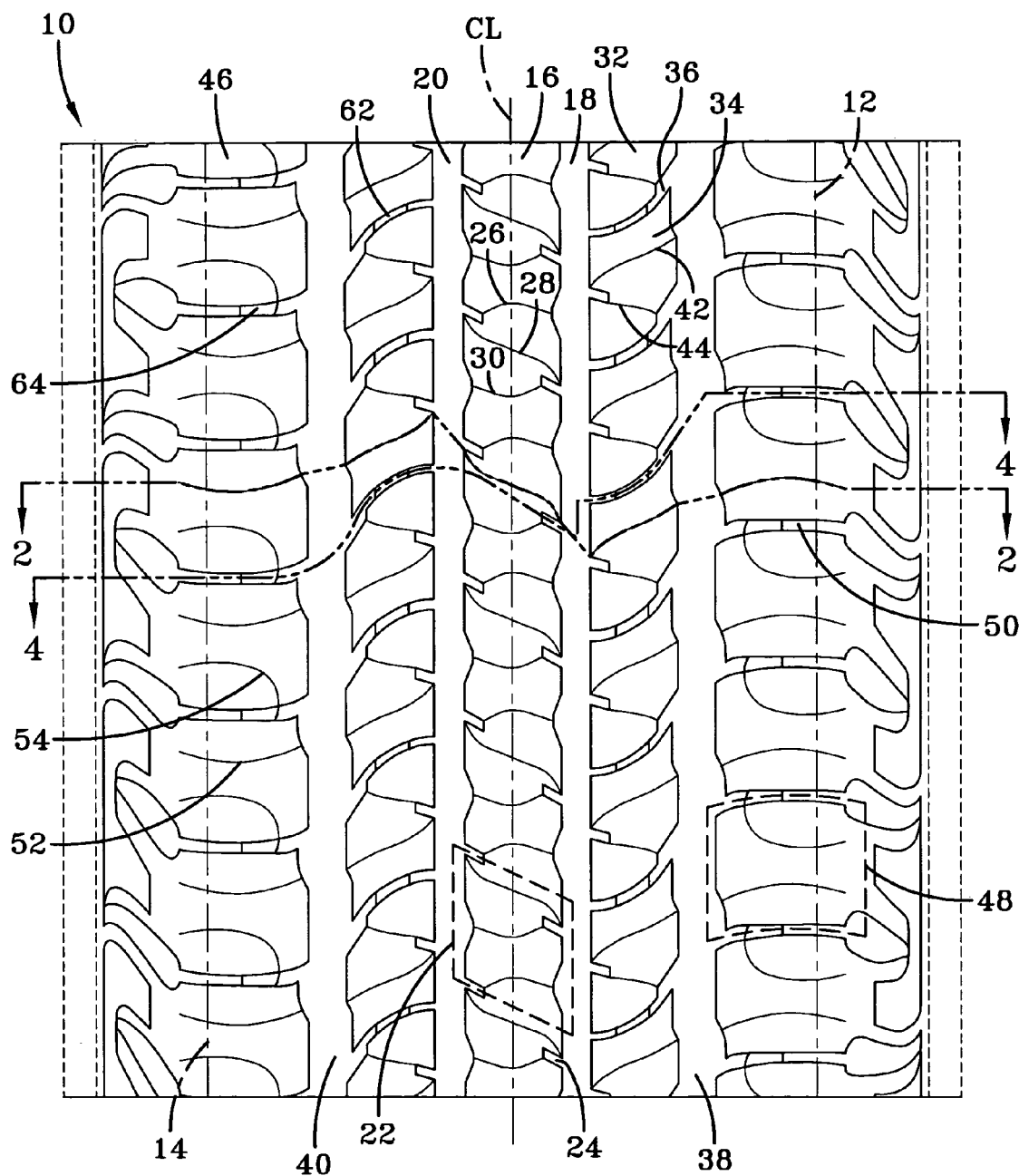
FIG. 1 is a top view of a tire tread.

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification. For purposes of this application, the various embodiments illustrated in the figures each use the same reference numeral for similar components. The structures employed basically the same components with variations in location or quantity thereby giving rise to the alternative constructions in which the inventive concept can be practiced.

FIG. 1 illustrates a tire tread 10 in accordance with the present invention. The tire tread 10 is intended to be placed on the radially outer surface of a pneumatic tire; and may be formed as the original tread of a pneumatic tire or a retread surface applied to a previously cured tire casing. The tread 10 has a tread centerline CL that defines the axial center of the tread 10 and a pair of opposing tread edges 12, 14 that define the tread width and the beginning of the tread shoulders.

The tread 10 has a center rib 16 that straddles the tread centerline CL. The center rib 16 is delineated by a pair of circumferentially extending grooves 18, 20, one groove located on each side of the center rib 16, and formed by a plurality of repetitive tread element 22. Extending axially inward from the circumferentially extending grooves 18, 20 and partially into the tread rib 16 are a plurality of notches 24. Extending through the repeating tread element 22 are a plurality of sipes 26, 28, 30. The illustrated sipes 26, 28, 30 have different configurations; however, the sipes 26, 28, 30 may have any configuration so long as there are sipes in the center rib 16.

On each axially outer side of the center rib 16 is an intermediate tread row 32. The intermediate rows 32 are formed by a plurality of repetitive tread blocks 34. The blocks 34 are separated by transverse grooves 36. The grooves 36 are steeply curved closest to the centermost circumferential grooves 18, 20 and are almost at a 90° angle as the grooves 36 connect with the outermost circumferential grooves 38, 40. The steeply curved portion assists in moving water away from the center of the tread 10 during wet performance. Within each block are a pair of sipes 42, 44. One sipe 42 extends between the circumferential grooves 18, 38 or 20, 40 and the other sipe 44 extends from the inner circumferential groove 16 or 18 to the edge of the transverse groove 36.

On each axially outer side of each intermediate row 32 is a shoulder tread row 46. The shoulder tread rows 46 are formed by a plurality of repetitive tread elements 48. The tread elements 48 are separated by a transverse groove 50, extending from the tread edge 12 or 14 to the circumferential grooves 38 or 40. Similar to the other tread elements, each tread element 48 has two sipes 52, 54 therein; the first sipe 52 extending from the tread edge to the circumferential grooves, the second sipe 54 extending from the tread edge to the transverse groove.

Figure 2:
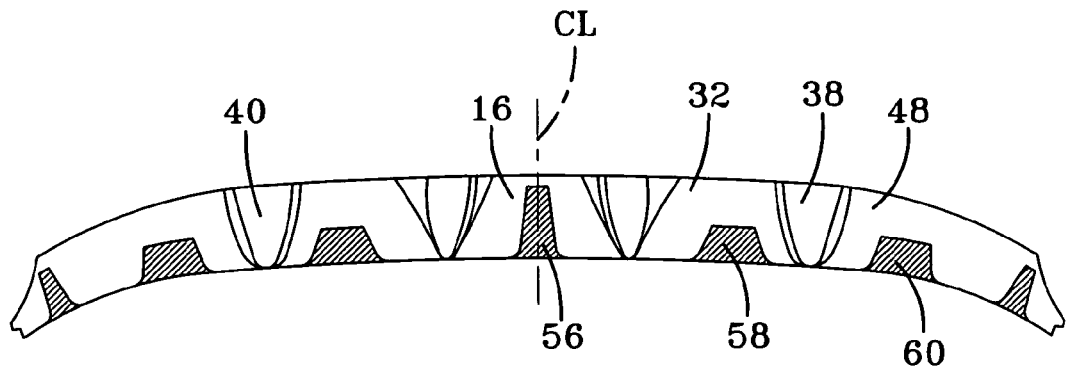
FIG. 2 is a cross sectional view of the tread along line 2-2 in FIG. 1.

In according to one aspect of the invention, at least one of the sipes 26, 28, or 30 of the center rib 16, at least one of the sipes 42 or 44 in each tread block 34 of the intermediate rows 32, and at least one of the sipes 52 or 54 in the repetitive tread elements 48 of the shoulder tread rows 46 has a tie-bar therein, see FIG. 2.

Within the tread center rib 16, at least one sipe 26, 28, or 30 has a tie bar 56 centered on the tread centerline CL. The tie bar 56 has a height greater than one-half of the depth of the adjacent circumferential groove 18 or 20, with a preferred height of 80-95% of the groove depth, the height of the tie bar 56 being measured from the base of the sipe 26, 28, see FIG. 2. Each sipe 26, 30 is a curved sipe having a tie bar curved correspondingly with the curved sipe.

Figure 3:
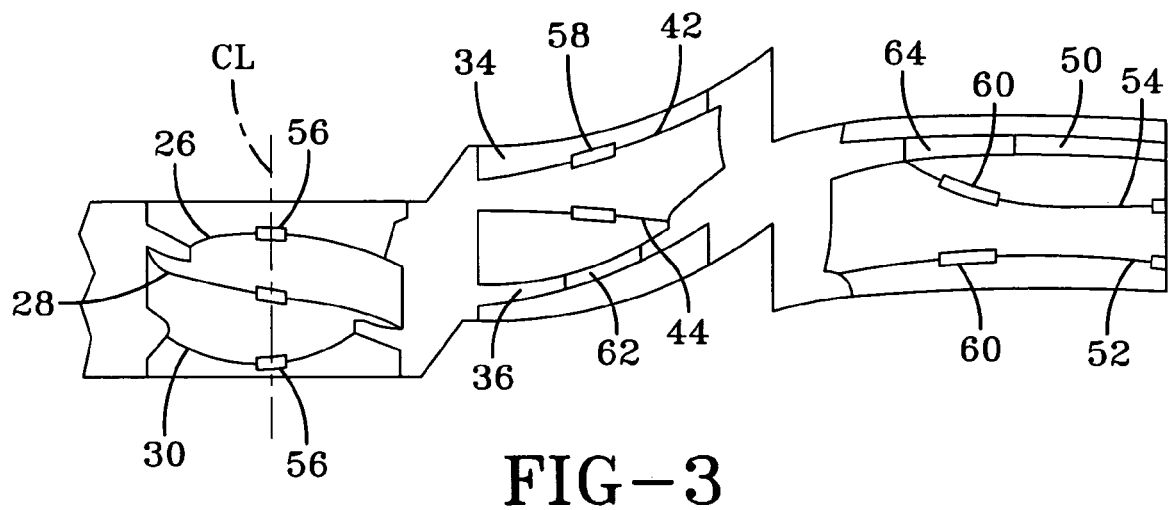
FIG. 3 is a segmented view of the tire tread.

Within the intermediate tread row 32, at least one sipe 42 or 44 has a tie bar 58. The tie bar 58 has a height approximately 40 to 60% of the depth of the adjacent circumferential grooves 18, 20, 38, 40. The tie bar 58 is axially centered relative to the maximum axial width of the tread block 34, see FIG. 3. FIG. 3 illustrates one design cycle of the tire, from one tire shoulder to the farthest side of the center rib. The thicker portion in each sipe 26, 28, 30, 42, 44, 52, 54 of FIG. 3 is merely illustrative of the location of the tie bar in each sipe, as viewed from above the tread surface.

Within the shoulder tread row 46, at least one sipe 52, 54 has at least one tie bar 60. The primary tie bar 60 is located in the center 20% of the tread element width, as measured from the greatest axially inner point of the tread row to the tread edge, see FIG. 3. The tie bar 60 has a height approximately 40-60% of the depth of the adjacent circumferential grooves. The tie bars 60 may have a height equal, greater, or less than the height of the tie bars 58 in the intermediate tread row. Each sipe 52, 54 is a curved sipe having a tie bar curved correspondingly with the curved sipe.

Each tie bar 56, 58, 60 in each sipe has a volume, calculated by the depth of the tie bar, the width of the tie bar, and the thickness of the tie bar sipe. The sipe tie bar 56 in the center rib 16 have a volume Vc, the sipe tie bar 58 in the intermediate tread rows 32 have a volume Vi, and the sipe tie bars 60 in the shoulder tread rows 46 have a volume Vs. The volume of the sipe tie bars 56, 58, 60 in each tread row is not more than 10% different, either greater or less, than the volume of the sipe tie bars 56, 58, 60 in any other tread row. Preferably, the volume of the sipe tie bars 56, 58, 60 in each tread row is substantially constant, with a variation in volume of not more than 5%.

By forming the sipe tie bars 56, 58, 60 with substantially constant volumes, the stiffness characteristics of the tread 10 are equalized across the tread surface. This in turn, reduces the noise generation of the tire.

To obtain the desired constant sipe tie bar volume, when the tie bar 56 in the center rib 16 has a height in the preferred range of 90-95% of the groove depth, the sipe tie bars 58, 60 in the intermediate tread rows 32 and the shoulder tread rows 46, having heights in the range of 40-60% of the groove depth, must have axial widths greater than the axial width of the sipe tie bar 56 in the center rib 16. The axial width of the sipe tie bars 58, 60 in the intermediate tread rows 32 and the shoulder tread rows 46 may or may not have the same axial width.

As seen in FIG. 3, all of the sipes 26, 28, 30, 42, 44, 52, 54 in each tread block or repetitive tread feature may be provided with a tie bar 56, 58, or 60. When all of the sipes are so provided with tie bars, preferably, the tie bars in each tread row 16, 32, 46 are circumferentially aligned. By aligning the sipe tie bars in each row, the rigidity of the tread row is increased.

Figure 4:
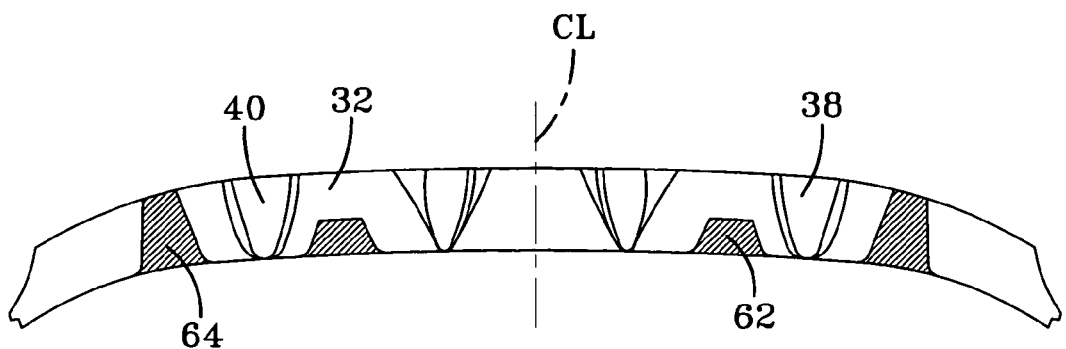
FIG. 4 is a second cross sectional view of the tire tread along line 4-4 in FIG. 1.

In addition to the tie bars in the sipes, in another aspect of the present invention, the transverse grooves 36 in the intermediate tread row 32 are provided with a tie bar 62, see FIGS. 1 and 4. The tie bar 62 has a height of 40 to 60% of the transverse groove depth 36, as measured from the base of the transverse groove 36. The presence of the tie bar 62 between the circumferentially adjacent tread elements 34 reduces the vibration of the tread elements, reducing the tire noise.

The shoulder tread element rows 46 are also provided with a tie bar 64 therein. The tie bar 64 has a height greater than one half (50%) of the transverse groove depth 50. In the illustrated embodiment, the tie bars 64 have a height equivalent to the depth of the transverse groove 50 that would fully bisect the shoulder tread element row 46 but for the tie bar 64. Similar to the intermediate row 32, the presence of the tie bar 64 creates a stiffer tread row, decreasing vibration of the tread elements and reducing the noise generated during tire rotation.

In one embodiment, the tie bars 62 in the intermediate row 32 have a height of less than 50% of the transverse groove depth while the tie bars 64 in the shoulder row 46 have a height of greater than 50% of the groove depth, preferably, greater than 80% of the groove depth.

In accordance with another embodiment of the invention, the volume of the groove tie bars 62 in the intermediate tread element row 32 is approximately 40-95% of the volume of the groove tie bar 64 in the shoulder tread element row 46. Preferably, the intermediate groove tie bar volume is in the range of 40-50% or 80-95% of the shoulder groove tie bar volume.

Values in the first range provide for stiffer shoulders while values in the second range tend toward equalizing the stiffness of the two tread element rows. Variations in the sipe volume ratio may be achieved by varying the axial widths or heights of the tie bars 62, 64.

The use of the sipe tie bars and the groove tie bars may be exclusive of one another. Preferably, to achieve the desired noise characteristics, the tread employs both the sipe tie bars and the groove tie bars.

Additionally, while the illustrated tread is directed toward a tread having five ribs or block rows, the teachings regarding the sipe tie bars and the groove tie bars may be applied towards a tread having a different number of ribs. Of primary importance for the sipe tie bars is that if one tread rib/block row is centered on the tread center line CL, at least one sipe in the rib/block row has a tie bar centered on the tread centerline, and this sipe tie bar has the greatest height relative to any sipe tie bars in the other rib/block rows. The height of the sipe tie bars in the remaining rows decreases from the tread center line CL to the tread edge, with the volume of the sipe tie bars being substantially similar for all sipe tie bars. Of primary importance for the transverse groove tie bars is that the height of the tie bars increases from the tread centerline CL to the tread edge with the tie bar volume not differing by more than 10%.

What is claimed is:

1. A tire tread intended to be located on a radially outer surface of a tire, the tread comprising a first row of tread elements, a second row of tread elements, and a third row of tread elements disposed between the first row and the second row, each tread element in the first, second, and third rows having a first and a second curved sipe therein, wherein the first and second curved sipes in each of the first, second, and third rows have a tie bar therein, the tie bar of each first and second curved sipe being curved correspondingly with the curved sipe, each first and second curved tie bar of the third tread row being located on a centerline of the tread, wherein, the first and second curved sipes in each of the first, second, and third rows of tread elements has a first volume, the curved sipe tie bar in each first and second curved sipe has a second volume, and each second volume in one of the tread rows is not more than 10% different from another second volume in another tread row, each tread element of the third tread row having a first notch extending axially and circumferentially toward the centerline of the tread, each notch having a first end portion and a second end portion axially inward of the first end portion, one sipe in each tread element of the third tread row extending from the first end portion of each notch toward the centerline of the tread and one of the curved sipes of each tread element of the third tread row extending from the second end portion of each notch toward the centerline of the tread.

2. The tread of claim 1 wherein the tread elements of the first and second rows are shoulder tread elements.

3. The tread of claim 1 wherein each tread element of the third tread row further has a second notch extending axially and circumferentially toward the centerline of the tread and disposed on the other side of the centerline of the tread from the first notch, each second notch having a first end portion and a second end portion axially inward of the first end portion, the one sipe of each tread element of the third tread row extending from the first end portion of the first notch to the first end portion of the second notch.

* * * * *